United States Patent
Li et al.

(10) Patent No.: US 8,417,891 B2
(45) Date of Patent: Apr. 9, 2013

(54) SHARED CACHE MEMORIES FOR MULTI-CORE PROCESSORS

(75) Inventors: Wenlong Li, Beijing (CN); Yu Chen, Beijing (CN); Changkyu Kim, San Jose, CA (US); Christopher J. Hughes, Cupertino, CA (US); Yen-Kuang Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 938 days.

(21) Appl. No.: 12/335,381

(22) Filed: Dec. 15, 2008

(65) Prior Publication Data

US 2010/0153649 A1  Jun. 17, 2010

(51) Int. Cl.
*G06F 12/00* (2006.01)

(52) U.S. Cl. .. 711/130; 711/133; 711/144; 711/E12.024

(58) Field of Classification Search .................. 711/130, 711/133, 144, E12.024
See application file for complete search history.

(56) References Cited

U.S. PATENT DOCUMENTS

| | | | | |
|---|---|---|---|---|
| 6,016,531 | A * | 1/2000 | Rixner et al. | 711/118 |
| 6,532,520 | B1 * | 3/2003 | Dean et al. | 711/133 |
| 2006/0230235 | A1 * | 10/2006 | O'Connor et al. | 711/133 |
| 2008/0235456 | A1 * | 9/2008 | Kornegay et al. | 711/130 |
| 2009/0006755 | A1 * | 1/2009 | Illikkal et al. | 711/126 |

OTHER PUBLICATIONS

Thornock et al. Facilitating level three cache studies using set sampling. Simulation Conference, 2000 [Dec. 2000], [retrieved on Jan. 11, 2012]. Retrieved from the Internet <URL:http://ieeexplore.ieee.org/stamp/stamp.jsp?tp=&arnumber=899754>.*

Chang, J., et al., "Cooperative cache partitioning for chip multiprocessor", In Proc. of the 21st Annual International Conference on Supercomputing, 11 pages, Jun. 2007.

Iyer, R., "CQoS: a framework for enabling QoS in shared caches of CMP platforms", In Proc. of the 18th Annual International Conference on Supercomputing, 10 pages, Jun. 2004.

Kim, S., et al., "Fair Cache Sharing and Partitioning in a Chip Multiprocessor Architecture", In Proc. of the 13th International Conference on Parallel Architectures and Compilation Techniques, 12 pages, Sep. 2004.

Stone, H.S., et al., "Optimal Partitioning of Cache Memory", IEEE Trans. Computers, 41(9):1054-1068, Sep. 1992.

Suh, G.E., et al., "A New Memory Monitoring Scheme for Memory-Aware Scheduling and Partitioning", In Proc. of the 8th Annual Intl. Symp. on High Perf. Computer Architecture, 27 pages, Feb. 2002.

(Continued)

*Primary Examiner* — Hashem Farrokh
*Assistant Examiner* — Larry MacKall
(74) *Attorney, Agent, or Firm* — Trop, Pruner & Hu, P.C.

(57) ABSTRACT

Embodiments of shared cache memories for multi-core processors are presented. In one embodiment, a cache memory comprises a group of sampling cache sets and a controller to determine a number of misses that occur in the group of sampling cache sets. The controller is operable to determine a victim cache line for a cache set based at least in part on the number of misses.

17 Claims, 8 Drawing Sheets

OTHER PUBLICATIONS

Jaleel, W., et al., "Adaptive Insertion Policies forManaging Shared Caches on CMPs", In Proc. of the 17th International Conference on Parallel Architectures and Compilation Techniques, 20 pages, Oct. 2008.

Qureshi, M.K., et al., "Adaptive insertion policies for high performance caching", In Proceedings of the 34th Annual international Symposium on Computer Architecture (San Diego, California, Jun. 9-13, 2007). ISCA '07. ACM, New York, NY, pp. 381-391.

Chen, Yu, et al., "Efficient Shared Cache Management through Sharing-Aware Replacement and Streaming-Aware Insertion Policy", IEEE, 2009, 11 pages.

* cited by examiner

SHARED CACHE MEMORIES FOR MULTI-CORE PROCESSORS

FIELD OF THE INVENTION

Embodiments of the invention relate to data storage in computer systems; more particularly, embodiments of the invention relate to shared cache memories and replacement policies thereof.

BACKGROUND OF THE INVENTION

Efficient management of shared cache memories in a computer system with multi-core processors is crucial to the performance of the system. Multithreading execution also impacts reusability of data stored in cache memories.

Applications running on multi-core processors show different memory access behaviors (e.g., spatial locality and temporal locality of data). Some applications perform better when more shared data are kept in a cache, while some applications perform better when more private data are kept in the cache.

A replacement policy (e.g., a least recently used policy) is used to select a victim cache line for eviction and has an effect on miss rate performance of a cache. Typically, whether data in the cache are shared or not has not been a factor in replacement policies.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Embodiments of shared cache memories for multi-core processors are presented. In one embodiment, a cache memory comprises a group of sampling cache sets and a controller to determine a number of misses that occur in the group of sampling cache sets. The controller is operable to determine a victim cache line for a cache set based at least in part on the number of misses.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Overview

Figure 1:
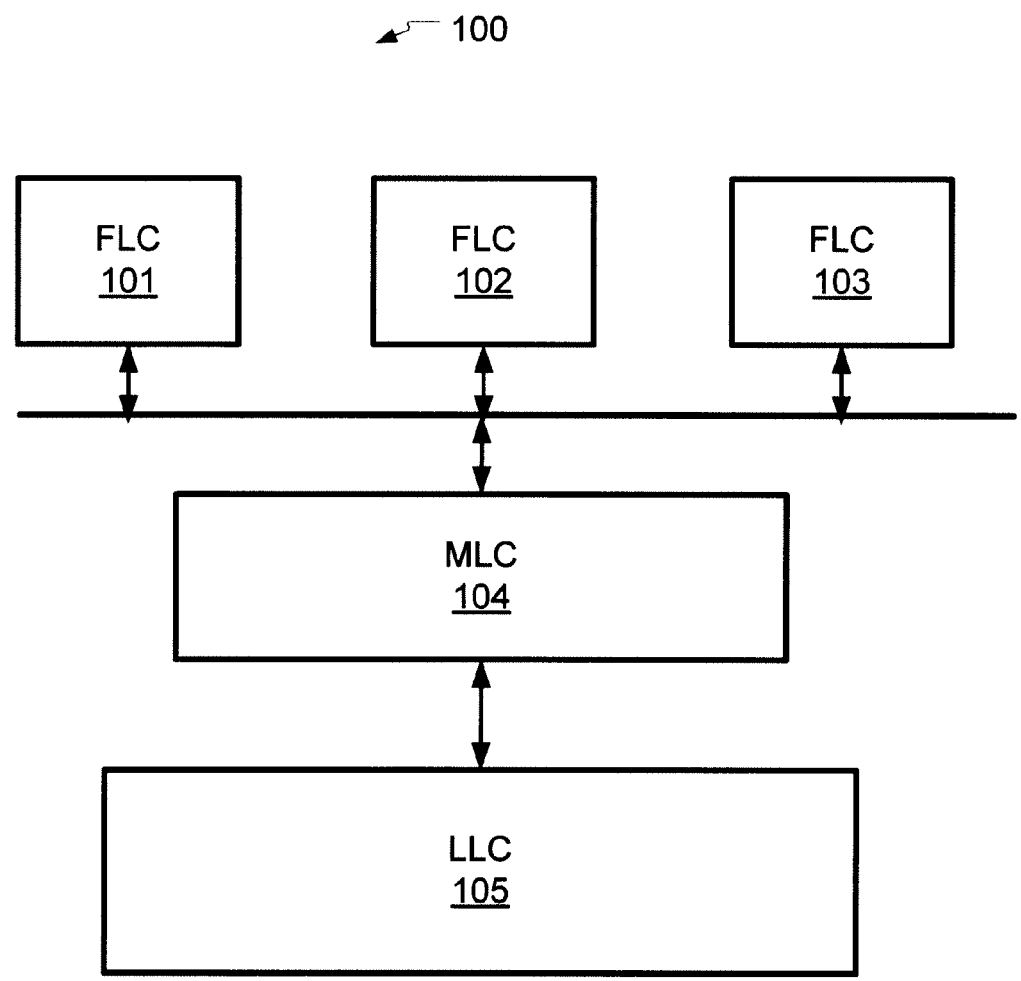
FIG. 1 shows an embodiment of multi-level shared cache memories.

FIG. 1 shows an embodiment of multi-level shared cache memories. Referring to FIG. 1, in one embodiment, multi-level shared cache memories comprise lowest level cache memory (LLC) 105, middle level cache memory (MLC) 104, first level cache memories (FLC) 101-103. In one embodiment, LLC 105 is coupled to main storage of a computer system (not shown) and MLC 104. In one embodiment, MLC 104 is coupled to FLC101-FLC103.

In one embodiment, the number of cache memories in each level varies in different computer system configurations. In one embodiment, MLC 104 comprises one or more cache memories. In one embodiment, a computer system comprises one or more cache memories in the middle level of a multi-level cache system.

In one embodiment, FLC 101 is a private cache for use by one processing core in a multi-core processor. In one embodiment, MLC 104 and LLC 105 are shared cache memories for use by a multi-core processor. In one embodiment, MLC 104 is a private cache memory for use by a processor (e.g. multi-core processor) of a multi-processor system.

In one embodiment, a cache set in MLC 104 is partitioned logically into two groups of cache lines, a group of cache lines to store shared data and another group of cache lines to store private data. In one embodiment, LLC 105 is also partitioned in a similar manner. Identification of whether a cache line is a shared cache line or a private cache line will be described in further detail below with additional references to the remaining figures.

It should be noted that the depicted system could be implemented in different forms. That is, it could be implemented in a single chip module, on a single substrate, in a single package, in a circuit board, or a chassis having multiple circuit boards. Similarly, it could be a part of a system-on-chip (SOC).

Figure 2:
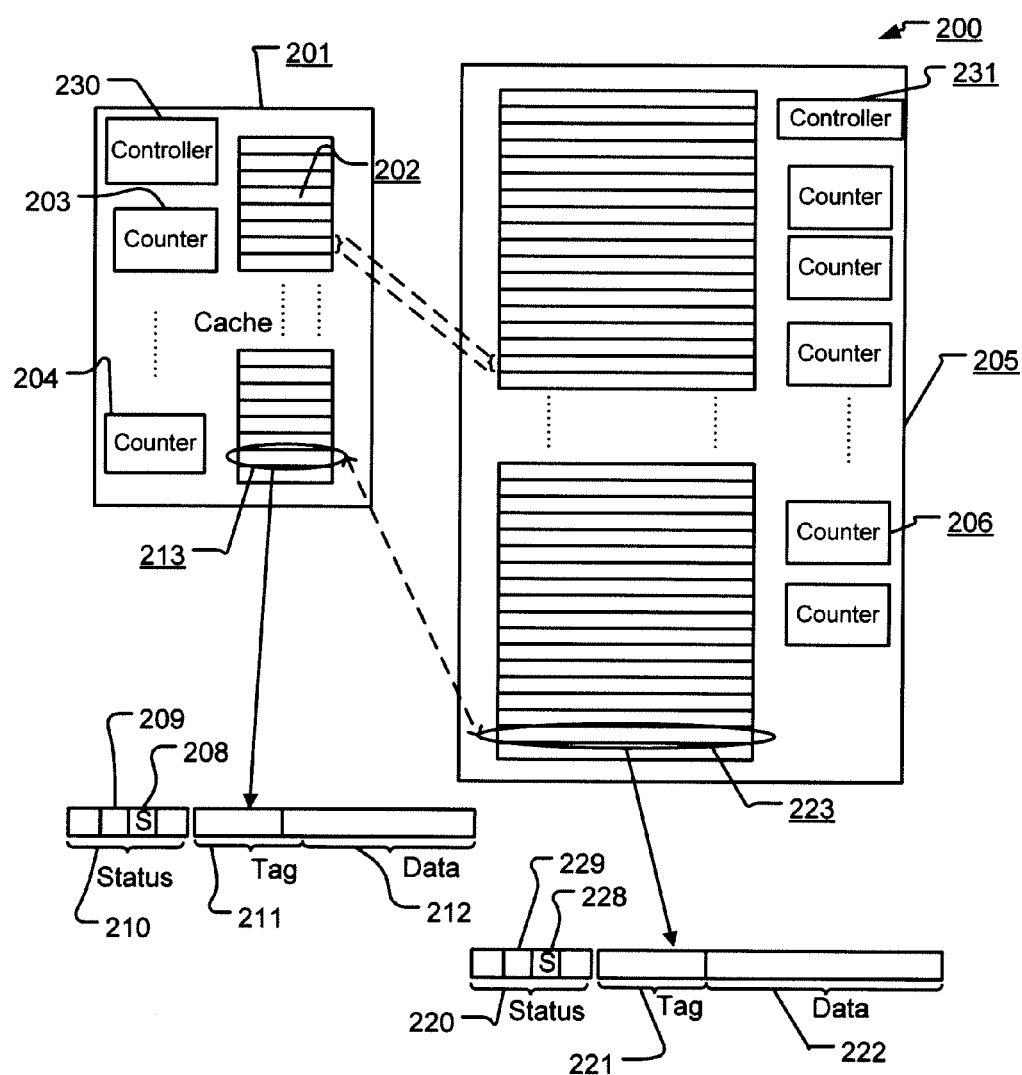
FIG. 2 shows an embodiment of a middle level cache memory and a lower level cache memory.

FIG. 2 shows an embodiment of a middle level cache memory and a lower level cache memory. Referring to FIG. 2, in one embodiment, a cache memory system comprises two levels of cache memories. In one embodiment, more than two levels of cache memories exist in a multi-level cache system.

FIG. 2 shows cache 201 and lower level cache (LLC) 205 corresponding to cache 201. In one embodiment, cache 201 stores (mirrors) data which are also stored in lower level cache 205. In one embodiment, lower level cache 205 is the lowest level cache. In one embodiment, cache 201 is a middle level cache memory.

In one embodiment, cache 201 comprises a number of cache sets. Each cache set includes a number of cache lines. In one embodiment, the number of cache lines in a cache set corresponds to the number of ways in a cache memory. For example, each cache set of a 16-way cache memory comprises 16 cache lines.

In one embodiment, cache 201 includes controller 230, counter 203, counter 204, and cache lines (e.g., cache lines 202, 213). In one embodiment, cache 205 includes controller 231, cache lines (e.g., cache line 223) and a number of counters including counter 206.

In one embodiment, controllers 230 and 231 manage activities in the cache memories including updating (e.g., setting, changing, clearing, etc.) status bits. Each controller could include multiple controllers. The controllers could be located inside or outside of a cache.

In one embodiment, a cache line (e.g., cache lines 202, 213, and 223) as shown in the inset includes three sections, namely status section 210, tag section 211 and data section 212. Data section 212 stores actual content of a cache line and is used for applications and system running on computer systems. Tag section 211 contains an address tag, which is well known in the art. Status section 210 contains information (e.g., status indicators) about the current state of the data stored in the cache line, such as dirty bit, validity bit, and coherence state bits.

In one embodiment, status section 210 associated with cache line 213 comprises a sharing bit (sharing bit 208) and a core identification value (ID 209). In one embodiment, status section 220 associated with cache line 223 comprises a sharing bit (sharing bit 228) and a core identification value (ID 229).

In one embodiment, sharing bit 208 indicates whether a cache line is designated to store shared data. In one embodiment, a cache line for storing shared data (e.g., data that are used by more than one processing core) is referred to herein as a shared cache line. Sharing bit 208 is set to '1' if cache line 213 is a shared cache line. In one embodiment, a cache line for storing private data (e.g., data that are accessed by only one processing core) is referred to herein as a private cache line. Sharing bit 208 is set to '0' if cache line 213 is a private cache line. In one embodiment, sharing bit 208 is configurable by controller 230.

In one embodiment, each core (processing core) in a multi-core processor is associated with a unique core identification value (core ID). In one embodiment, a core ID associated with a cache line indicates a processing core (of a multi-core processor) that first brings current data into the cache line. For example, ID 209 of cache line 213 is set to indicate a processing core that causes current data to be stored in cache line 213. In one embodiment, ID 209 stores a unique core ID number. In one embodiment, a quad-core processor includes four processing cores that are numbered as 0, 1, 2, and 3 respectively. It will be appreciated by those skilled in the art that other representations are possible to identify a processing core. In one embodiment, a memory request is associated with a core ID of the core that initiates the memory request. In one embodiment, for an N-core processor, a unique core ID is represented by $\log_2 N$ bits.

In one embodiment, a hit occurs if the cache stores valid data for the memory request. In one embodiment, a miss occurs if the cache line does not store valid data as requested by the memory request.

In one embodiment, when a hit occurs during a memory request to cache line 223 in LLC 205, controller 231 compares the core ID of the memory request with ID 229 (associated with cache line 223). If the values of the IDs are different (mismatch), controller 231 sets sharing bit 228 to '1'. Otherwise, sharing bit 228 remains unchanged (an initial state of sharing bit 228 is '0').

In one embodiment, when a miss occurs during a memory request to cache line 223 in LLC 205, controller 231 determines the core ID of the memory request and stores the core ID value in ID 229. In one embodiment, controller 231 determines the core ID of a memory request that causes data to be brought and stored in cache line 223 and stores the value in core ID 229.

In one embodiment, when a miss occurs during a memory request to cache line 213 in cache 201, controller 230 requests corresponding data from LLC 205 and fills the data in cache line 213. In one embodiment, controller 230 also sets sharing bit 208 according to the sharing bit of the cache line storing the data in LLC 205. For example, cache line 213 receives data from cache line 223, and controller 230 sets the value of sharing bit 208 to the value of sharing bit 228. In one embodiment, controller 230 sets core ID 209 according to the core ID of the cache line storing the data in LLC 205. For example, cache line 213 receives data from cache line 223, and controller 230 sets the value of core ID 209 to the value of core ID 229.

In one embodiment, when a hit occurs during a memory request to cache line 213 in cache 201, controller 230 compares the core ID of the memory request with ID 209 (associated with cache line 213). If the values of the IDs are different (mismatch), controller 230 sets sharing bit 208 to '1'. Otherwise, sharing bit 208 remains unchanged (remains as '0').

In one embodiment, controller 230 updates sharing bit 208 based on a coherence protocol. In one embodiment, for a broadcast-based protocol (e.g., cache 201 is connected to processing cores via a bus), controller 230 compares the core ID of a memory request with ID 209 to determine whether to change value of sharing bit 208. In one embodiment, for a directory-based protocol, each cache line contains information about the cores that have accessed the cache line (or have mirrored the cache line in private caches respectively). Controller 230 determines whether a cache line is a shared cache line based on the information and the core ID of a memory request.

In one embodiment, controller 230 sets sharing bit 208 to '1' if a processing core accesses (requests to access, snoops, or read) cache line 213 which has not been accessed by the same processing core previously (brought in to cache 201 by another processing core).

In one embodiment, when cache line 213 of cache 201 is evicted, controller 230 sends write back information to lower level cache 205. In one embodiment, the write back information includes sharing bit 208. Controller 231 of lower level cache 205 copies the value of sharing bit 208 to sharing bit 228 (if cache line 223 corresponds to cache line 213) because sharing bit 208 contains the most up-to-date information about whether a cache line is a shared cache line or a private cache line.

In one embodiment, for an 8-core processor, a unique core ID is represented by 3 bits. In one embodiment, sharing bit 208 is a 1-bit value. In one embodiment, the hardware overhead for sharing detection is less than 0.8% for a 16-way cache memory in conjunction with a processor with eight cores. In one embodiment, a cache line comprises at least 538 bits (26 bits for tag information, 64 bytes of data). In one embodiment, the number of additional bit storage for a cache line is 4 (1 bit for a sharing bit, 3 bits for core ID).

In one embodiment, lower level cache 205 is implemented using stacked dynamic access memory (DRAM) technology. In one embodiment, lower level cache 205 is implemented using other technologies, such as, for example, embedded DRAM and 3D-stacked cache.

Figure 3:
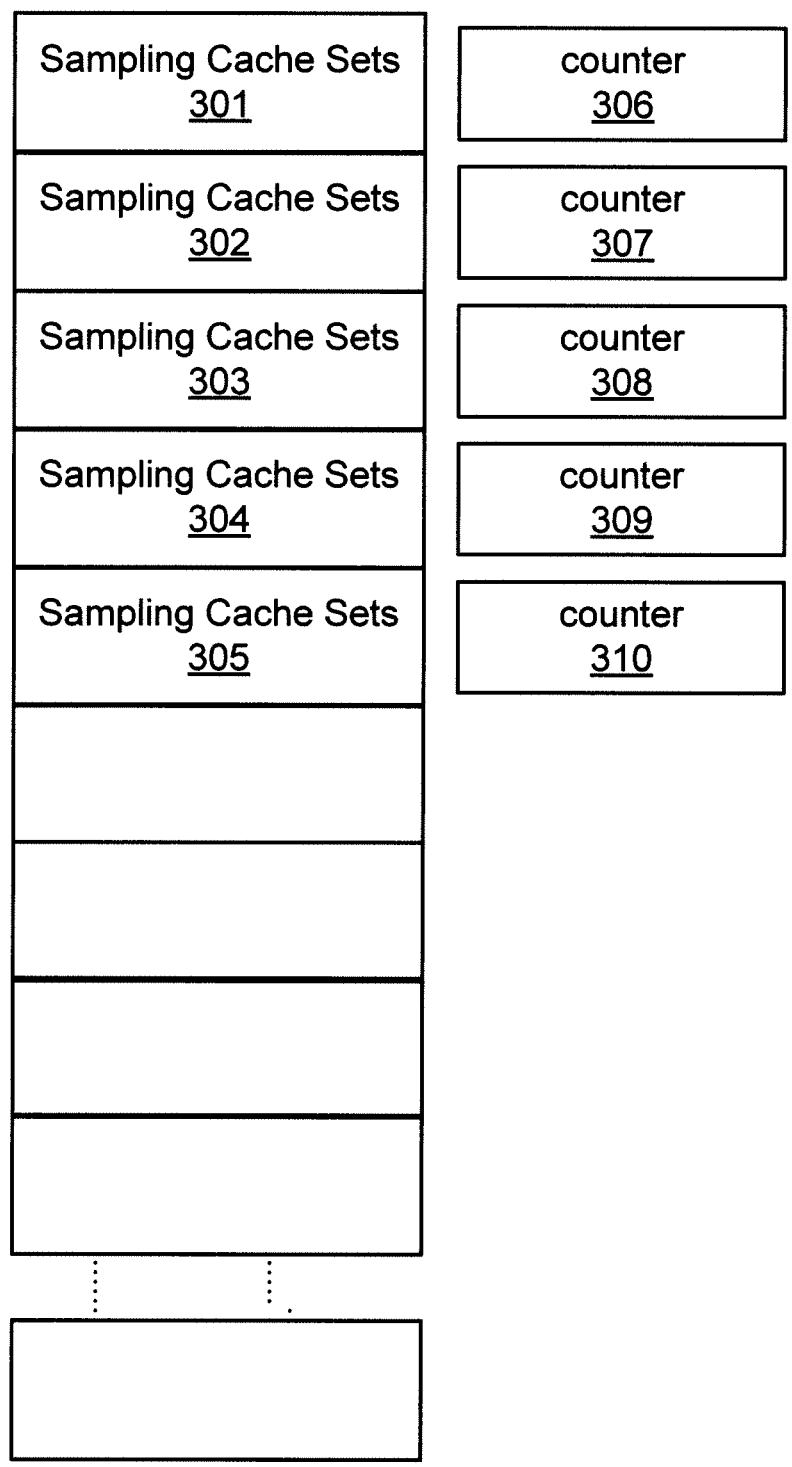
FIG. 3 shows an embodiment of a cache memory with sampling cache sets.

FIG. 3 shows an embodiment of a cache memory with sampling cache sets. Referring to FIG. 3, in one embodiment, a cache memory includes several groups of sampling cache sets (e.g., groups of sampling cache sets 301-305) and several counters (counters 306-310).

In one embodiment, a cache memory includes 5 groups of sampling cache sets (301-305). The cache memory further includes many other non-sampling cache sets. Sampling cache sets are used to collect information (e.g., eviction rate of cache lines or cache miss rates) for use to determine replacement policies for the non-sampling cache sets. In one embodiment, only a portion of cache sets in a cache memory are sampling cache sets.

In one embodiment, a group of sampling cache sets includes 32 cache sets. A cache set includes a number of cache lines. In one embodiment, the number of cache lines in a cache set corresponds to the number of ways in the cache memory. For example, a cache set comprises 16 cache lines in a 16-way cache memory.

In one embodiment, a cache set is partitioned (logically or physically) into two types of cache lines, shared cache lines and private cache lines.

In one embodiment, the number of groups of sampling cache sets, the number of cache sets in a sampling group, the number of cache lines a cache set, and the ratio of shared cache lines to private cache lines are configurable. In one embodiment, such parameters are adaptable in different configurations.

In one embodiment, a cache controller (not shown) determines a ratio setting of a cache set to determine the ratio of cache lines (shared vs. private) in the cache set. In one embodiment, cache sets in a same sampling group have a same ratio setting. In one embodiment, the ratio of cache lines (shared vs. private) in a cache set is hardwired. In one embodiment, the ratio setting is configurable by a cache controller.

In one embodiment, a group of sampling cache sets is associated with a counter. For example, the group of sampling cache sets 301 is associated with counter 306. In one embodiment, counter 306 is used to count the number of evictions (or cache misses) that occur because of memory requests to cache sets of sampling cache sets 301. In one embodiment, the value of counter 306 increases for each miss (or eviction) occurs in any cache set of sampling cache sets 301.

In one embodiment, counter 306 is logic implemented within the cache memory. In one embodiment, counter 306 is represented by a counting value controlled by an external controller, such as, for example, a processor.

In one embodiment, sampling cache sets 301 are configured to select shared cache lines for eviction (as a victim cache line). When selecting a victim cache line in a cache set, if more than one shared cache line exists, another replacement algorithm (e.g., least recently used) is used to select among the shared cache lines. If all the cache lines are private cache lines, another replacement algorithm is used to select among the private cache lines. In one embodiment, one or more other algorithms are used during the selection of a victim cache line.

In one embodiment, sampling cache sets 302 are configured to select private cache lines for eviction (as a victim cache line). When selecting a victim cache line in a cache set, if more than one private cache line exists, another replacement algorithm (e.g., least recently used) is used to select among the private cache lines. If all the cache lines are shared cache lines, the least recently used shared cache line is selected for eviction.

In one embodiment, sampling cache sets 303 are configured to choose a victim for eviction based on a predetermined ratio. In one embodiment, the ratio setting of a cache set is set as 4 share cache lines versus 12 private cache lines (16 cache lines per cache set). If the ratio is violated (for example, 5 shared cache lines and 11 private cache lines exist) and the next incoming data are private data, a least recently used shared cache line (among the 5 shared cache line) is selected as a victim cache line. As such, after the replacement the ratio is restored as 4 shared cache lines to 12 private cache lines. In one embodiment, a victim cache line is selected based on the type of incoming data if the ratio setting is not violated.

In one embodiment, sampling cache sets 304 and sampling cache sets 305 are set to different ratio settings. In one embodiment, a ratio setting is a pair of values, for example, 14:2 represents a ratio of 14 shared cache lines to 2 private cache lines.

In one embodiment, only sampling cache sets 301 and sampling cache sets 302 are used in a cache memory. In one embodiment, groups of sampling cache sets 301-305 are set to different ratio settings. In one embodiment, information collected from sampling cache sets (e.g., eviction rate, miss rate) is used for determining a replacement policy for other non-sampling cache sets in a cache memory.

Figure 4:
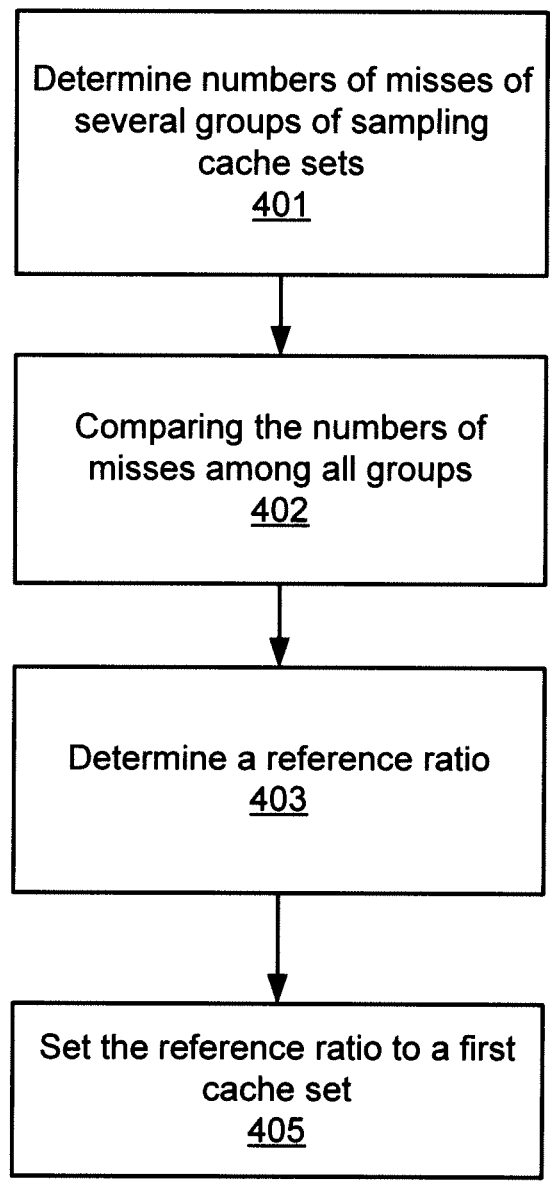
FIG. 4 is a flow diagram of one embodiment of a process to determine a reference ratio.

FIG. 4 is a flow diagram of one embodiment of a process to determine a reference ratio. The process is performed by processing logic that may comprise hardware (circuitry, dedicated logic, etc.), software (such as one that is run on a general purpose computer system or a dedicated machine), or a combination of both. In one embodiment, the process is performed in conjunction with a cache controller (e.g., controller 230 in FIG. 2). In one embodiment, the process is performed by a computer system with respect to FIG. 7.

In one embodiment, processing logic determines the number of misses that occur for each group of sampling cache sets (process block 401). In one embodiment, five groups of sampling cache sets exist. Each group includes 32 cache sets. In one embodiment, a 10-bit counter is associated with each group. A counter is increased in response to a cache miss (or an eviction) caused by a memory request to a sampling group.

In one embodiment, processing logic compares the numbers of misses for all the groups of sampling cache sets (process block 402). In one embodiment, processing logic compares the numbers of misses for all the groups of sampling cache sets when one of the counters saturates. In one embodiment, a counter saturates when the counter value increases or decreases to a boundary value.

In one embodiment, processing logic selects a group with the lowest number of misses and uses the ratio setting of the group as a reference ratio (process block 403). In one embodiment, a ratio setting is a pair of values, for example, 14:2, which represents a ratio of 14 shared cache lines to 2 private cache lines.

In one embodiment, processing logic sets the reference ratio to all other non-sampling cache sets (process block 405).

In one embodiment, processing logic prevents frequent oscillation of the reference ratio setting by referring to a search window. In one embodiment, processing logic prevents the reference ratio from switching back and forth between two very different settings (e.g., 2:14 and 14:2).

In one embodiment, processing logic changes the reference ratio setting only if the new ratio setting is within a search window. For example, if a reference ratio is 10:6, processing logic only accepts a new reference ratio setting such as (10+K:6−K) or (10−K:6+K), where K is the size of the search window, such as, for example, 1, 2, 3, and 4.

In one embodiment, the size of a search window is larger during the beginning of a sampling period. In one embodiment, the size of a search window is larger if there are more cache lines in each cache set. In one embodiment, processing logic increases the size of the search window if no new reference ratio is set after a few sampling periods. In one embodiment, processing logic sets the reference ratio permanently after a period of time.

Figure 5:
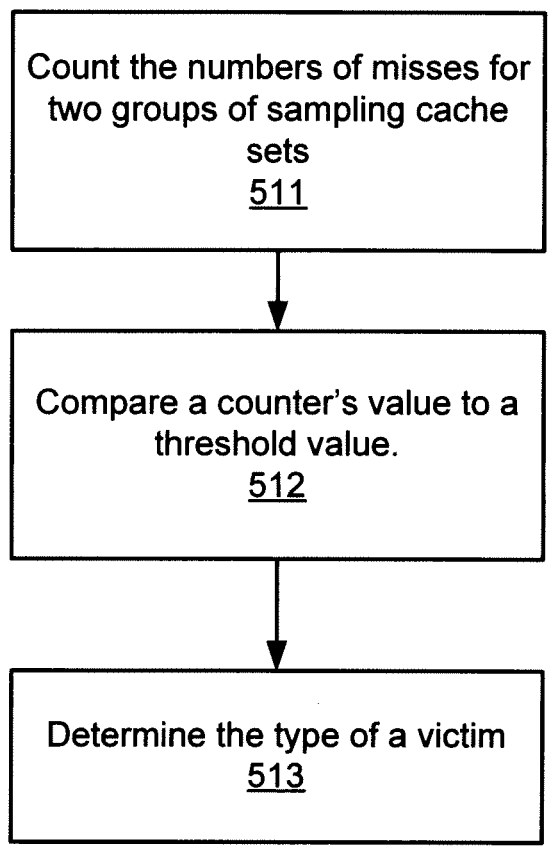
FIG. 5 is a flow diagram of one embodiment of a process to determine whether to evict a shared cache line or a private cache line.

FIG. 5 is a flow diagram of one embodiment of a process to determine whether to evict a shared cache line or a private cache line. The process is performed by processing logic that may comprise hardware (circuitry, dedicated logic, etc.), software (such as one that is run on a general purpose computer system or a dedicated machine), or a combination of both. In one embodiment, the process is performed in conjunction with a cache controller (e.g., controller 230 in FIG. 2). In one embodiment, the process is performed by a computer system with respect to FIG. 7.

In one embodiment, two groups of sampling cache sets are used. In one embodiment, a group of sampling cache sets includes 32 cache sets respectively.

In one embodiment, processing logic selects a private cache line as a victim cache line of a cache set in the first group of sampling cache sets. If more than one private cache line exists in the cache set, processing logic selects the least recently used private cache line. If all the cache lines are shared cache lines, processing logic selects the least recently used shared cache line for eviction.

In one embodiment, processing logic selects a shared cache line as a victim cache line of a cache set in the second group of sampling cache sets. If more than one shared cache line exists in the cache set, processing logic selects the least recently used shared cache line. If all the cache lines are private cache lines, processing logic selects the least recently used private cache line for eviction.

In one embodiment, processing logic determines the numbers of misses that occur for the two groups of sampling cache sets (process block 511). In one embodiment, a 10-bit counter is used. The counter is increased in response to a cache miss (or eviction) caused by a memory request to the first group but is decreased in response to a cache miss caused by a memory request to the second group.

In one embodiment, processing logic compares the value of the counter with a threshold value (e.g., 512). In one embodiment, the threshold value is configurable. Based on a result of the comparison, processing logic determines a type of a victim cache line (shared or private) to be selected for eviction in non-sampling cache sets (process block 513).

In one embodiment, if the counter's value is higher than a threshold value, processing logic determines that the type of a victim cache line to be selected is a shared cache line. Otherwise, processing logic determines that the type of a victim cache line to be selected is a private cache line.

In one embodiment, a counter is used to count the number of misses for each group respectively. Processing logic compares the counters' values of the two groups. If the counter's value of the first group is higher, processing logic determines that the type of a victim cache line to be selected is a shared cache line. Otherwise, if the counter's value of the second group is higher, processing logic determines that the type of a victim cache line to be selected is a private cache line (process block 513).

Figure 6:
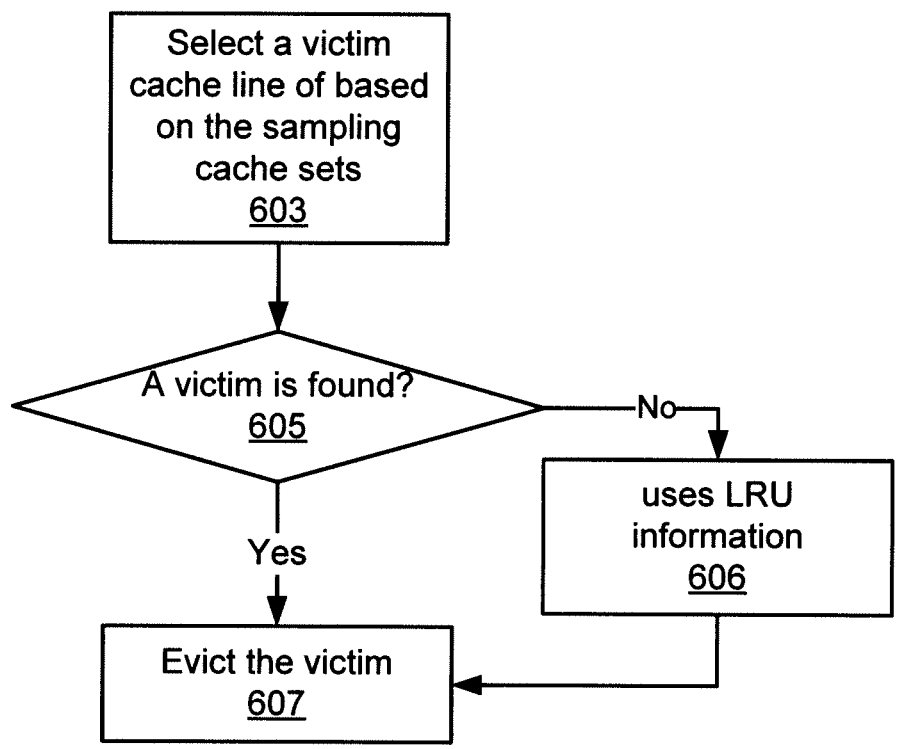
FIG. 6 is a flow diagram of one embodiment of a process to select a victim cache line.

FIG. 6 is a flow diagram of one embodiment of a process to select a victim cache line. The process is performed by processing logic that may comprise hardware (circuitry, dedicated logic, etc.), software (such as one that is run on a general purpose computer system or a dedicated machine), or a combination of both. In one embodiment, the process is performed in conjunction with a cache controller (e.g., controller 230 in FIG. 2). In one embodiment, the process is performed by a computer system with respect to FIG. 7.

In one embodiment, processing logic selects a cache line for eviction in response to a cache miss. In one embodiment, processing logic selects a victim cache line based on the information from sampling cache sets (process block 603). In one embodiment, processing logic determines a replacement policy based on information from sampling cache sets.

In one embodiment, if a victim cache line is found (process block 605), the victim cache line is evicted. Otherwise, if a victim cache line is not found, processing logic refers to least recently used information to select a victim cache line (process block 606). Processing logic evicts the victim cache line (process block 607).

In one embodiment, processing logic determines to select a shared cache line as a victim cache line. If more than one shared cache line exists, processing logic selects a least recently used shared cache line among the shared cache lines. If no shared cache line exists, processing logic selects the least recently used private cache line for eviction.

In one embodiment, processing logic determines to select a private cache lines as a victim cache line. If more than one private cache line exists, processing logic selects a least recently used private cache line among the private cache lines. If no private cache line exists, processing logic selects the least recently used shared cache line for eviction.

In one embodiment, processing logic sets a reference ratio setting for all non-sampling cache sets. In one embodiment, the ratio setting is 12 private cache lines to 4 shared cache lines (16 cache lines per cache set). If the ratio setting is not maintained (for example, 11 private cache lines and 5 shared cache lines exist) and the next incoming data are private, the least recently used shared cache line is selected as a victim cache line. As such, after the replacement the ratio is restored to 12 private cache lines to 4 shared cache lines.

In one embodiment, if the ratio setting is maintained (not violated), processing logic selects a victim cache line based on the type of incoming data. For example, if incoming data are private data, processing logic selects a private cache line as a victim cache line. If incoming data are shared data, processing logic selects a shared cache line as a victim cache line.

In one embodiment, processing logic determines whether a cache line is a shared cache line or otherwise in conjunction with the embodiment in FIG. 2. In one embodiment, processing logic determines the type of a cache line by using other approaches, such as, for example, an underlying cache coherence protocol, information in translation look-aside buffers (TLB), etc.

In one embodiment, the miss rate of a middle level cache memory is reduced when data with high temporal locality are stored in the cache memory longer when compared to traditional cache replacement policies.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 7:
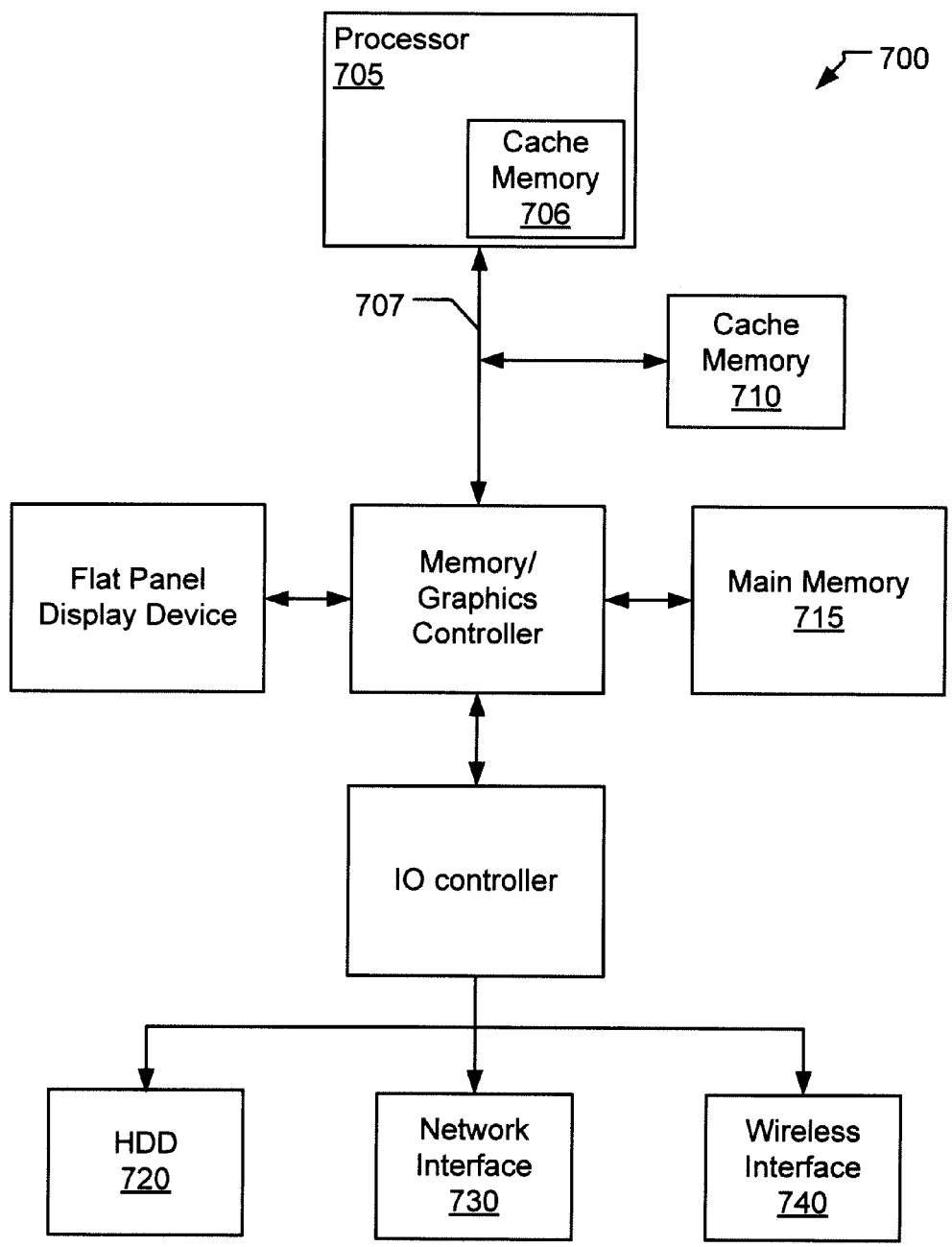
FIG. 7 illustrates a computer system in conjunction with one embodiment of the present invention.

FIG. 7, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 7. Furthermore, in other embodiments of the invention may be distributed throughout several circuits, logic units, or devices illustrated in FIG. 7.

Figure 8:
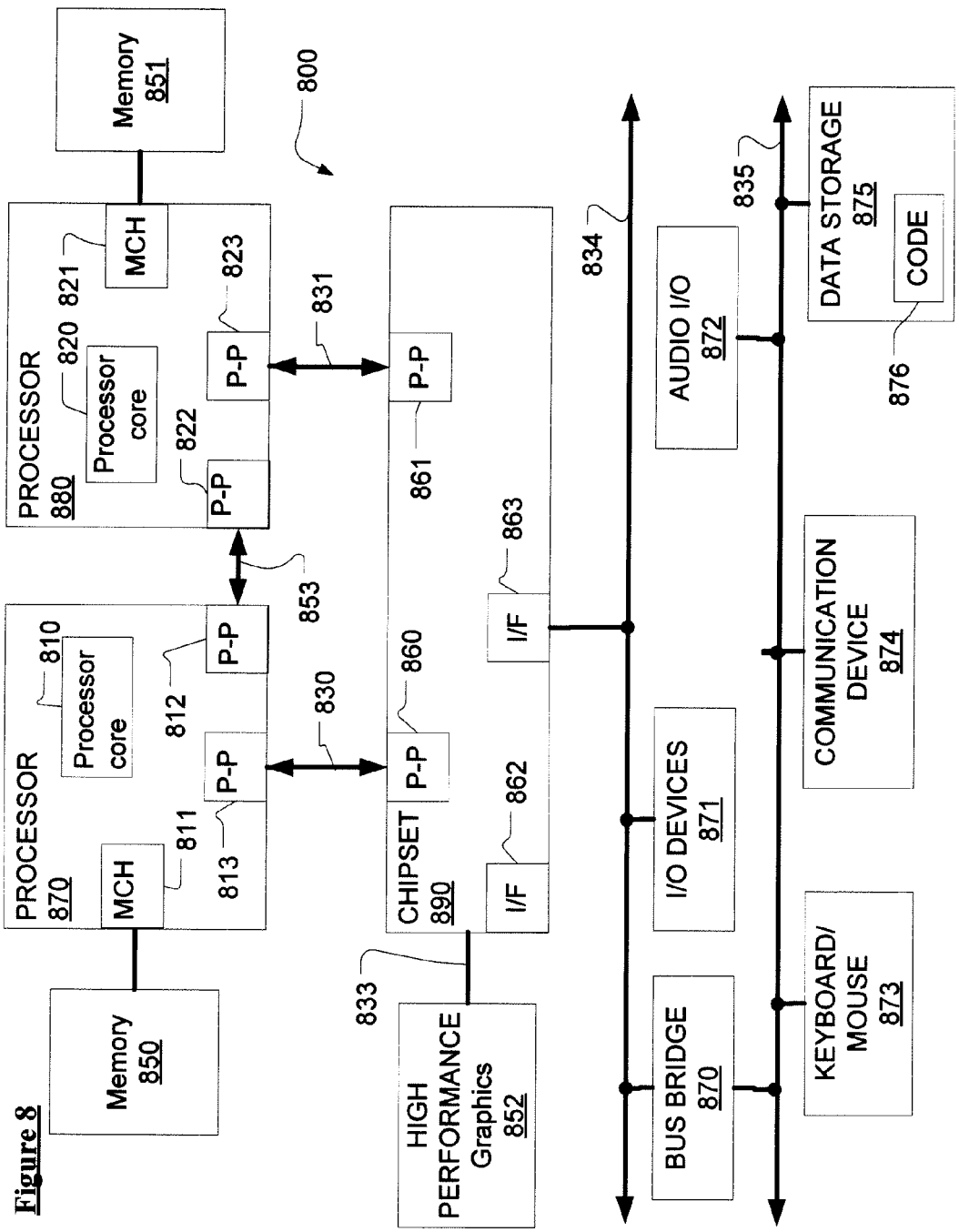
FIG. 8 illustrates a point-to-point computer system in conjunction with one embodiment of the invention.

Similarly, at least one embodiment may be implemented within a point-to-point computer system. FIG. 8, for example, illustrates a computer system that is arranged in a point-to-point (PtP) configuration. In particular, FIG. 8 shows a system where processors, memory, and input/output devices are interconnected by a number of point-to-point interfaces.

The system of FIG. 8 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or within data storage 875, or within memory 850 of FIG. 8.

Other embodiments of the invention, however, may exist in other circuits, logic units, or devices within the system of FIG. 8. Furthermore, in other embodiments of the invention may be distributed throughout several circuits, logic units, or devices illustrated in FIG. 8.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising:
    a first cache set including a first plurality of cache lines and a second plurality of cache lines;
    a first group of sampling cache sets;
    a first controller to determine a number of misses that occur in the first group of sampling cache sets;
    a second controller to determine a victim cache line for the first cache set based at least on the number of misses from the first group; and
    a second group of sampling cache sets, wherein the first group is operable to select a victim cache line with shared data, wherein the second group is operable to select a victim cache line with non-shared data, wherein the second controller is operable to determine a victim cache line for the first cache set based on a first number of misses that occur in the first group and a second number of misses that occur in the second group.

2. The apparatus of claim 1, wherein the first controller and the second controller are the same.

3. The apparatus of claim 1, wherein the first cache set is a non-sampling cache set.

4. The apparatus of claim 1, wherein the first controller is operable to set a reference ratio of the first plurality of cache lines versus the second plurality of cache lines, wherein the first plurality of cache lines is operable to store shared data unless the reference ratio is violated.

5. The apparatus of claim 1, wherein the first group of sampling cache sets comprises a second cache set and is associated with a first ratio setting, the first ratio setting being a first plurality of cache lines of the second cache set to store shared data versus a second plurality of cache lines of the second cache set to store non-shared data.

6. The apparatus of claim 5, further comprising one or more groups of sampling cache sets in addition to the first group of sampling cache set, wherein the first controller is operable to set a reference ratio setting according to the first ratio setting if the number of misses that occur in the first group is the lowest among other groups.

7. The apparatus of claim 6, wherein the reference ratio setting is moderated within a search window.

8. The apparatus of claim 1, further comprising a counter with a counting value that is updated based on whether a miss occurs in the first group or in the second group, wherein the second controller is operable to select a victim cache line based on the counting value.

9. The apparatus of claim 1, wherein the first plurality of cache lines is in a first cache memory, the apparatus of claim 1 further comprises:
    a first storage area to store a first indication to indicate whether a first cache line of the first plurality of cache lines is a shared cache line and a first value to indicate a first processor core that causes data to be stored in the first cache line; and
    a third controller to compare the first value to a second value indicating a second processor core that causes a cache hit at the first cache line, wherein the third controller is to set the first indication to indicate that the first cache line is a shared cache line if the first value is not equal to the second value.

10. The apparatus of claim 9, further comprising:
    a second cache memory comprising a second cache line, wherein the second cache memory and the first cache memory are caches in different levels;
    a second storage area to store a second indication to indicate whether the second cache line is a shared cache line; and a fourth controller, in response to a cache miss on the first cache line, to copy the second indication to the first indication and copy data from the second cache line to the first cache line.

11. The apparatus of claim 10, wherein the fourth controller is operable to send the first indication to the second cache memory if data in first cache line is evicted.

12. The apparatus of claim 10, wherein the first cache memory is a middle level cache and the second cache memory is a lowest level cache.

13. The apparatus of claim 9, wherein a second cache memory is a stacked dynamic random access memory (DRAM).

14. A method comprising:
  partitioning, logically, a first cache set to a first plurality of cache lines and a second plurality of cache lines, wherein the first cache set is from a cache memory comprising one or more groups of sampling cache sets; and
  determining a number of misses that occur in a group of the one or more groups of sampling cache sets;
  determining a victim cache line for the first cache set based at least on a first counting value that counts the number of misses;
  setting a reference ratio of the first plurality of cache lines versus the second plurality of cache lines, wherein the first plurality of cache lines is to store shared data;
  selecting a victim cache line with which the reference ratio is conformed, wherein each group of the one or more groups of sampling cache sets is associated with a ratio respectively, the ratio being a first plurality of cache lines to store shared data versus a second plurality of cache lines to store non-shared data, in every cache set; and
  setting the reference ratio to the ratio associated with a group of sampling cache sets with the lowest number of misses.

15. The method of claim 14, further comprising copying a sharing bit and a core identification value associated with a cache line in a cache memory of a different cache level.

16. The method of claim 14, wherein the first cache set is a non-sampling cache set.

17. The method of claim 14, wherein the one or more groups of sampling cache sets comprising a first group of sampling cache sets and a second group of sampling cache sets, further comprising:
  selecting a least recently used cache line that stores shared data as a victim cache line, if a cache set is of the first group of sampling cache sets;
  selecting a least recently used cache line that stores non-shared data as a victim cache line, if a cache set is of the second group of sampling cache sets;
  updating a counting value based on whether a miss occurs in the first group or the in the second group; and
  determining a victim cache line for the first cache set based at least on the counting value.

\* \* \* \* \*